United States Patent
Jones et al.

(10) Patent No.: US 11,377,588 B2
(45) Date of Patent: Jul. 5, 2022

(54) WELL TREATMENT FLUIDS COMPOSITION

(71) Applicant: SOLVAY USA INC., Princeton, NJ (US)

(72) Inventors: Christopher Raymond Jones, Staffordshire (GB); Stephanie Edmunds, West Midlands (GB); Jean C. Molina, Midland, TX (US)

(73) Assignee: SOLVAY USA INC., Princeton, NJ (US)

( * ) Notice: Subject to any disclaimer, the term of this patent is extended or adjusted under 35 U.S.C. 154(b) by 0 days.

(21) Appl. No.: 17/189,164

(22) Filed: Mar. 1, 2021

(65) Prior Publication Data

US 2021/0179927 A1 Jun. 17, 2021

Related U.S. Application Data

(62) Division of application No. 15/370,090, filed on Dec. 6, 2016, now Pat. No. 10,968,384.

(60) Provisional application No. 62/263,836, filed on Dec. 7, 2015.

(51) Int. Cl.
| | |
|---|---|
| *C09K 8/035* | (2006.01) |
| *C09K 8/60* | (2006.01) |
| *C09K 8/62* | (2006.01) |
| *E21B 43/26* | (2006.01) |

(52) U.S. Cl.
CPC ............. *C09K 8/605* (2013.01); *C09K 8/035* (2013.01); *C09K 8/62* (2013.01); *C09K 2208/26* (2013.01); *E21B 43/26* (2013.01)

(58) Field of Classification Search
CPC .... C09K 2208/26; C09K 8/035; C09K 8/605; C09K 8/62; E21B 43/26
See application file for complete search history.

(56) References Cited

U.S. PATENT DOCUMENTS

| | | | |
|---|---|---|---|
| 2006/0111521 A1* | 5/2006 | Berry | C08J 3/02 525/474 |
| 2012/0073821 A1* | 3/2012 | Holtsclaw | C09K 8/605 166/310 |
| 2014/0080792 A1* | 3/2014 | Jones | A01N 57/20 514/129 |
| 2015/0038471 A1* | 2/2015 | Lee | C09K 8/04 507/237 |

* cited by examiner

*Primary Examiner* — Alicia Bland
(74) *Attorney, Agent, or Firm* — Osha Bergman Watanabe & Burton LLP

(57) ABSTRACT

A well treatment fluid composition that includes a tetrakis (hydroxyorgano)phosphonium salt and 1,3-dimethylol-5,5-dimethylhydantoin. Methods for preparing a well treatment fluid composition and treating a subterranean formation are also presented.

14 Claims, 3 Drawing Sheets

WELL TREATMENT FLUIDS COMPOSITION

CROSS-REFERENCE TO RELATED APPLICATION

The present application claims the benefit of priority under 35 U.S.C. § 119(e) of U.S. Provisional Application Ser. No. 62/263,836, filed on Dec. 7, 2015, the entire disclosure of which is incorporated herein by reference.

BACKGROUND

Microorganisms in oilfields or in injection water where water is collected from ponds or similar water sources may include iron-oxidizing bacteria, sulfate-reducing bacteria, slime-forming bacteria, sulfide oxidizing bacteria, yeast and molds, and protozoa. Biocides are used to treat water and destroy bacteria or a substantial amount of bacteria during a biocide treatment.

There is constant demand for new treatment fluids biocides to control the proliferation of undesired bacteria in oil and gas applications, notably in hydraulic fracturing and oil field reservoir treatments to control reservoir souring.

SUMMARY

The present invention provides a more effective, cost-efficient, sustainable well treatment biocide composition with impact upon the external environment minimized.

The present disclosure provides a composition suitable in or as a well treatment composition that includes a tetrakis (hydroxyorgano)phosphonium salt, herein-referred as "THP salt", and 1,3-dimethylol-5,5-dimethylhydantoin.

The 1,3-dimethylol-5,5-dimethylhydantoin of the invention has typically the following formula:

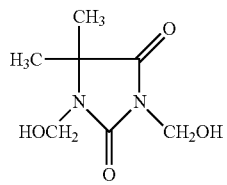

It was found that the composition of the present invention provided a fast kill whilst pumping. It was also found that the composition of the invention provided long term preservation after pumping and enhanced biofilm control to prevent or mitigate reservoir souring. In certain embodiments, the composition of the present invention allows to achieve both effects as described above.

DETAILED DESCRIPTION

Figure 1:
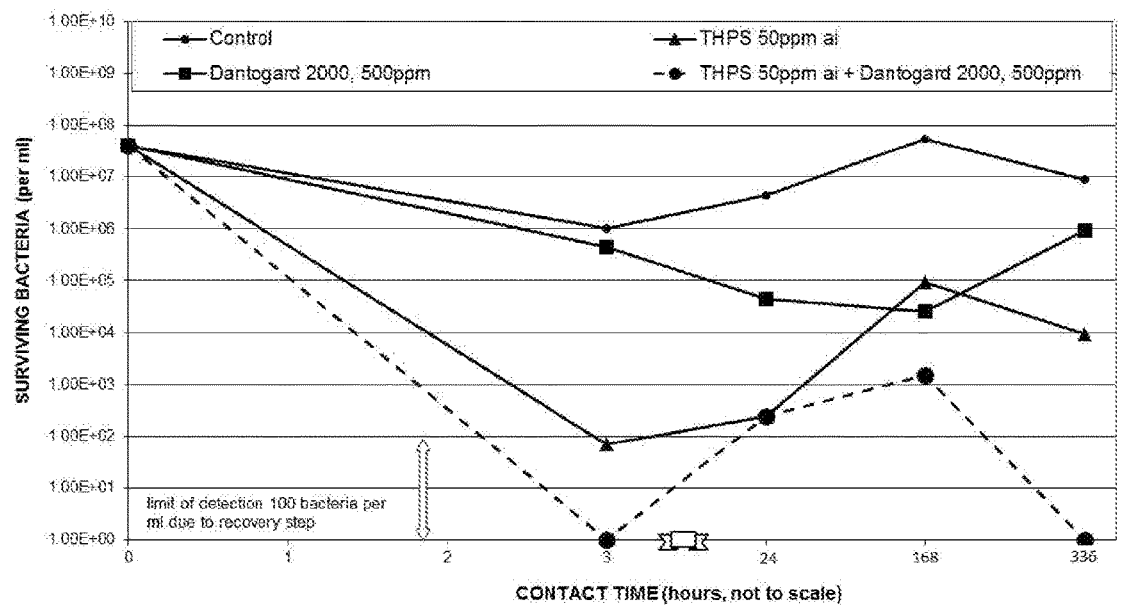
FIG. 1 provides a standard quantitative suspension test on the effect of the composition based on THPS and 1,3-Dimethylol-5,5-dimethylhydantoin (referred to as DANTOGARD® 2000 and treatment concentrations expressed as product containing approximately 50% active ingredient of 1,3-Dimethylol-5,5-dimethylhydantoin) against General Heterotrophic Bacteria *Pseudomonas aeruginosa* contained in an artificial biofilm.

In general, well treatment compositions according to the present disclosure include a THP salt and 1,3-dimethylol-5,5-dimethylhydantoin. Experimental results surprisingly indicate that a simultaneous use of a THP salt and 1,3-dimethylol-5,5-dimethylhydantoin in well treatment fluids lead to a particularly effective treatment.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure also provides a method of treating a water system contaminated, or liable to contamination, with microbes such as bacteria, fungi or algae, which method includes adding to the system separately or together, a biocidally active amount of a THP salt and 1,3-dimethylol-5,5-dimethylhydantoin.

The water system may, for instance, be contaminated with bacterial slime and/or planktonic bacteria. Compositions of the present disclosure may be of use for treating aerobic systems such as cooling towers, paper processing systems and waste water systems, and also for anaerobic systems, such as oil wells, e.g. during secondary recovery. Compositions of the present disclosure may also be suitable for use in the preservation of slurries and functional fluids, such as drilling muds, completion fluids, stimulation fluids and fracturing fluids.

In the present invention the active microbes may be active bacteria (e.g. general heterotrophic bacteria (GHB), sulphate-reducing bacteria), or other active microbes, such as archaea, (e.g. methanogenic archaea or sulphate-reducing archaea). Thus the microbial activity may be due to active bacteria or to other active microbes, such as archaea.

The invention may be used in relation to any bacteria (or other microbes) that can be found in petroleum reservoirs, including sulphate-reducing prokaryotes (SRP) (which may be sulphate-reducing bacteria and/or sulphate-reducing archaea), general heterotrophic bacteria (GHB), and nitrate-reducing bacteria (NRB).

As used herein, the term "well treatment fluid" is meant to encompass partial and/or complete compositions suitable for introduction into a wellbore or subterranean formation. Well treatment fluids include, but are not limited to, hydraulic fracturing fluids.

According to one specific feature, the compositions of the invention further comprise at least one oxidizing viscosity breaker.

In certain embodiments, the well treatment fluid includes the oxidizing viscosity breaker in an amount from about 15 ppm to about 250 ppm active ingredient (e.g. breaker).

In certain embodiments, the well treatment fluid includes the THP salt in an amount from about 40 ppm to about 250 ppm active ingredient. According to an interesting embodiment, the THP salt is tetrakis(hydroxymethyl)phosphonium sulphate, herein-referred as "THPS". Other THP salts include the phosphite, bromide, fluoride, chloride, phosphate, carbonate, acetate, formate, citrate, borate, and silicate.

In certain embodiments, the well treatment fluid includes a THP salt, 1,3-dimethylol-5,5-dimethylhydantoin, a quaternary ammonium compound, and an oxidizing viscosity breaker. In a particular embodiment, the quaternary ammonium compound is benzalkonium chloride. In certain embodiments, the quaternary ammonium compound is present in an amount from about 5 ppm to about 50 ppm.

In certain embodiments, the well treatment fluid includes a THP salt, 1,3-dimethylol-5,5-dimethylhydantoin, a polymer of an unsaturated carboxylic acid or a copolymer of an unsaturated carboxylic acid with a sulphonic acid, the polymer or copolymer being terminated by a mono- or di-phosphonated unsaturated carboxylic add group or having such monomers incorporated into the polymer backbone. In certain embodiments, the polymer or copolymer is either terminated by vinylphosphonic acid (VPA) or vinylidene-1,1-diphosphonic acid (VDPA) or has such monomers incorporated into the polymer backbone; accordingly the polymer may be a random copolymer incorporating VPA and/or VDPA monomers.

In other embodiments, the polymer is a polyacrylate or an acrylate/sulphonate copolymer. In certain embodiments, the polymer is a polyacrylate terminated with vinylphosphonic acid, (hereinafter "VPA end-capped polymer") or with vinylidene-1,1-diphosphonic acid (hereinafter "VDPA end-capped polymer"), or is a polyacrylate incorporating VPA and/or VDPA monomers. In other embodiments, the polymer is an acrylate/sulphonate copolymer terminated with vinylidene-1,1-diphosphonic acid (hereinafter "VDPA end-capped copolymer") or with vinylphosphonic acid (hereinafter "VPA end-capped co-polymer"), or is an acrylate/sulphonate copolymer incorporating VPA and/or VDPA monomers.

In certain embodiments, the ratio of VPA or VDPA end-capped polymer or copolymer to THP salt, is, when expressed as a percentage by weight, in the range of from 0.5 to 50%, such as from 0.5 to 30%; preferably from 1 to 25%, such as from 1 to 20%, for example from 1 to 10% or from 2 to 8%; most preferably from 1 to 5%, for example from 3 to 5% (based upon active solids and upon a 1 to 74%, for example a 50%, active THP salt formulation).

In certain embodiments, it may be used a combination of the THP salt and the polymer of an unsaturated carboxylic acid or a copolymer of an unsaturated carboxylic acid with a sulphonic acid as disclosed in WO 2005/074688.

In certain embodiments, the oxidizing viscosity breaker is selected from peroxides (e.g. hydrogen peroxide), persulfates (e.g. sodium persulfate ("SP"), encapsulated ammonium persulfate ("AP")), and chlorites (e.g. sodium chlorite ("SC")).

In certain embodiments, the oxidizing viscosity breaker is present in the well treatment fluid in an amount that is effective to reduce the viscosity of the fluid. In certain embodiments, the breaker is present in an amount of at least about 0.25 gallons of dilute solution containing the breaker per thousand gallons of well treatment fluid (gpt), in some cases at least about 0.5 gpt, and can be up to about 1.5 gpt, in some cases up to about 3.0 gpt. In other embodiments, the breaker is present in an amount of at least about 0.25 pounds of dilute solution containing the breaker per thousand gallons of well treatment fluid (ppt), in some cases at least about 0.5 ppt, and can be up to about 2.0 ppt, in some cases up to about 3.0 ppt. The amount of dilute solution containing a breaker used in the friction reducing treatment solution can be any value or range between any of the values recited above. In certain embodiments, the dilute solution contains from about 5 wt % to about 10 wt % breaker in water.

As used herein, the term "dilute solution" means a solution containing a low concentration of solute compared to solvent. In certain embodiments, "solute" refers to breaker, biocide, or other active ingredient. In certain embodiments, the solvent is aqueous and includes water.

The THP salt and 1,3-dimethylol-5,5-dimethylhydantoin are present in the well treatment fluid in amounts that are effective to control or reduce a microbial population in the fluid. In an embodiment, compositions of THPS and 1,3-dimethylol-5,5-dimethylhydantoin contain less than 0.2% free formaldehyde after 4 months storage at 50° C., which is quite surprising for compositions containing a formaldehyde-release agent. The exact content of the composition of the present invention has to be defined on a case by case basis, but typically:

the THP salt is present in an amount of at least about 0.1 gallons of THP salt per thousand gallons of well treatment fluid (gpt) and, preferably at least about 0.25 gpt; the THP salt can be up to about 3 gpt, notably up to about 1.5 gpt, for example up to about 0.75 gpt.

the 1,3-dimethylol-5,5-dimethylhydantoin is typically present in an amount of about 0.1 to 15 gpt, notably about 1 to 10 gpt.

the mass ratio between the THP salt and 1,3-dimethylol-5,5-dimethylhydantoin in a composition is about 1:0.5 to 1:25, preferably about 1:2.5 to 1:12.5, for example about 1:0.6, 1:1.25, 1:1.8, 1:5 or 1:10.

In other embodiments, a THP salt, and 1,3-dimethylol-5,5-dimethylhydantoin and a quaternary ammonium compound ("quat") are present in the well treatment fluid. In certain embodiments, the THP salt/quat combination is present in an amount of at least about 0.1 gallons of THP salt/quat per thousand gallons of well treatment fluid (gpt) and can be up to about 0.3 gpt. These ranges for gpt correspond to a range from about 50 ppm to about 150 ppm biocide. The amount of THP salt or THP salt/quat used in the friction reducing treatment solution can be any value or range between any of the values recited above. In certain embodiments, the dilute solution contains from about 15 wt % to about 55 wt % THP salt in water. In certain embodiments, the dilute solution contains from about 45 wt % to about 55 wt % THP salt and quat in water.

In certain embodiments, a method for preparing a well treatment fluid composition is provided. In a particular embodiment, the method includes the steps of obtaining a well treatment composition that includes a THP salt and 1,3-dimethylol-5,5-dimethylhydantoin; and diluting the composition to form a diluted composition. In certain embodiments, the well treatment composition further at least one oxidizing viscosity breaker. In certain embodiments, the well treatment composition further includes a quaternary ammonium compound.

Also provided are methods for treating a subterranean formation that include the step of introducing a well treatment composition that includes:

a THP salt,
1,3-dimethylol-5,5-dimethylhydantoin,
optionally at least one oxidizing viscosity breaker,
optionally a polymer of an unsaturated carboxylic acid,
optionally a copolymer of an unsaturated carboxylic acid with a sulphonic acid, and
optionally a quaternary ammonium compound.

The present invention will further illustrated by the following examples. The examples given herewith are not intended to be limiting. Unless otherwise indicated, all percentages are by weight of the total composition.

EXAMPLES

As used herein, the abbreviation "ai" refers to active ingredient.

Example 1—Composition Based on THPS and 1,3-Dimethylol-5,5-Dimethylhydantoin, Such as DANTOGARD® 2000 (Lonza), Against General Heterotrophic Bacteria *Pseudomonas aeruginosa* Contained in an Artificial Biofilm Sample Preparation.

250 ppm 1,3-Dimethylol-5,5-dimethylhydantoin and 50 ppm THPS were used to treat an artificial biofilm containing General Heterotrophic Bacteria *Pseudomonas aeruginosa*.

A sterile QST medium was used for the studies. The bacterial challenge comes from the artificial biofilm. Studs were prepared from a 16 hour *Pseudomonas aeruginosa* culture grown in the appropriate growth medium. A sterile filter paper (Whatman No. 2) was placed onto an agar plate. 1 ml of 16 hr old culture was placed onto the surface and spread over the filter paper using a sterile spreader. Using sterile forceps 5 sterile freeze drying rubber bungs with O rings was placed onto the filter paper. The plates were incubated at 30° C. for approximately 5 days until the plate was covered with growth. The studs with biofilm were exposed to the biocide treatment for various contact times from 0 to 336 hours.

Sample Analysis.

The efficiency of the biocide treatments is measured using a standard quantitative suspension test (QST) method and enumerated using a most probable number (MPN) method. The efficiency of the biocide treatments was measured using a standard quantitative suspension test (QST) method and enumerated using a most probable number (MPN) method. A typical QST procedure is described as follows: 90 ml of QST medium is dispensed into glass screw cap bottles (100 ml nominal capacity) with magnetic followers and cap with the modified tops. The bottles and contents were sterilised by autoclaving (121° C. for 15 minutes). On cooling a further 9 ml of sterile QST medium was added to the bottles to bring the final volume to 99 ml. Immediately prior to the test the biocide stock solutions (1,3-Dimethylol-5,5-dimethylhydantoin and THPS) were prepared in sterile QST medium at a concentration such that when 1.0 ml was added to the test bottles the desired concentration was achieved (final test volume 100 ml). They were added to the test samples immediately following preparation The bottles were placed on a Multiplate magnetic stirrer to mix the biocide. The stock solutions were prepared at concentrations on a weight for volume basis mg/ml such that when 1.0 ml was added to the inoculated QST medium (final volume 100 ml) the desired final concentration of biocide was achieved. Two bottles were set up per biocide being tested per time point and two bottles for a biocide free control. Using sterile forceps one stud was removed from the plate, taking care not to disturb the biofilm, and using the modified tops place in the test bottles. Approximately 2 ml amounts of sterile glass beads of 1.5 to 2.5 mm diameter and sterile acid washed sand 50-150 mesh was dispensed into sterile screw cap plastic universal containers (30 ml nominal capacity). To these was added 10 ml sterile neutralising solution, QST medium supplemented with 5 g/L Sodium Thiosulphate and 5 g/L Glycine. One container is required per stud. A further two studs are removed from the plates for the Time 0 control samples and placed directly into the neutralising medium. The contents were vortex mixed at maximum speed in 3 consecutive 45 second bursts with a 15 second interval between each burst. The purpose of this procedure is to mechanically remove biofilm from the surface of the coupons and to further disrupt the removed biofilm into small fragments thereby producing a reasonably uniform dispersion of biofilm for enumeration. An aliquot of 5 ml was removed from each bottle and pooled into a third bottle and mixed thoroughly. 1.0 ml aliquots were removed from the pooled dispersion mix and inoculated into the first tube of a dilution series. This was carried out in duplicate. A serial dilution (10 fold steps) was carried out in the appropriate growth medium. At the predetermined time points the studs were removed from the test samples and place in the neutralising medium. The studs were processed in the same way as for the control sample. 1 ml aliquots were inoculated for the pooled samples in the first tube of a dilution series.

This was carried out in duplicate. A serial dilution (10 fold steps) was carried out in the appropriate growth medium, with the first tube in each series containing the same medium supplemented with glycine (5.0 g/l) and sodium thiosulphate (5.0 g/l) to inactivate any residual biocide carried into the dilution series with the QST medium. The dilution series was incubated at 25° C. and read after 48 hours. The end point was scored as the highest dilution in the series to show turbidity.

The experiment shows that at all contact times the combination of THPS and and 1,3-Dimethylol-5,5-dimethylhydantoin provide an enhanced reduction in bacterial numbers. (FIG. 1).

Example 2—Composition Based on THPS and 1,3-Dimethylol-5,5-Dimethylhydantoin, Such as DANTOGARD® 2000 (Lonza), Against General Heterotrophic Bacteria *Pseudomonas aeruginosa* Contained in an Artificial Biofilm Sample Preparation.

500 ppm 1,3-Dimethylol-5,5-dimethylhydantoin and 50 ppm THPS were used to treat an artificial biofilm containing General Heterotrophic Bacteria *Pseudomonas aeruginosa*. A sterile QST medium was used for the studies. The bacterial challenge comes from the artificial biofilm. Studs were prepared from a 16 hour *Pseudomonas aeruginosa* culture grown in the appropriate growth medium. A sterile filter paper (Whatman No. 2) was placed onto an agar plate. 1 ml of 16 hr old culture was placed onto the surface and spread over the filter paper using a sterile spreader. Using sterile forceps 5 sterile freeze drying rubber bungs with O rings was placed onto the filter paper. The plates were incubated at 30° C. for approximately 5 days until the plate was covered with growth. The studs with biofilm were exposed to the biocide treatment for various contact times from 0 to 336 hours.

Sample Analysis.

The efficiency of the biocide treatments is measured using a standard quantitative suspension test (QST) method and enumerated using a most probable number (MPN) method. The efficiency of the biocide treatments was measured using a standard quantitative suspension test (QST) method and enumerated using a most probable number (MPN) method. A typical QST procedure is described as follows: 90 ml of QST medium is dispensed into glass screw cap bottles (100 ml nominal capacity) with magnetic followers and cap with the modified tops. The bottles and contents were sterilised by autoclaving (121° C. for 15 minutes). On cooling a further 9 ml of sterile QST medium was added to the bottles to bring the final volume to 99 ml. Immediately prior to the test the biocide stock solutions (1,3-Dimethylol-5,5-dimethylhydantoin and THPS) were prepared in sterile QST medium at a concentration such that when 1.0 ml was added to the test bottles the desired concentration was achieved (final test volume 100 ml). They were added to the test samples immediately following preparation. The bottles were placed on a Multiplate magnetic stirrer to mix the biocide. The stock solutions were prepared at concentrations on a weight for volume basis mg/ml such that when 1.0 ml was added to the inoculated QST medium (final volume 100 ml) the desired final concentration of biocide was achieved. Two bottles were set up per biocide being tested per time point and two bottles for a biocide free control. Using sterile forceps one stud was removed from the plate, taking care not to disturb the biofilm, and using the modified tops place in the test bottles. Approximately 2 ml amounts of sterile glass beads of 1.5 to 2.5 mm diameter and sterile acid washed sand 50-150 mesh was dispensed into sterile screw cap plastic universal containers (30 ml nominal capacity). To these was added 10 ml sterile neutralising solution, QST medium supplemented with 5 g/L Sodium Thiosulphate and 5 g/L Glycine. One container is required per stud. A further two studs are removed from the plates for the Time 0 control samples and placed directly into the neutralising medium. The contents were vortex mixed at maximum speed in 3 consecutive 45 second bursts with a 15 second interval between each burst. The purpose of this procedure is to mechanically remove biofilm from the surface of the coupons and to further disrupt the removed biofilm into small fragments thereby producing a reasonably uniform dispersion of biofilm for enumeration. An aliquot of 5 ml was removed from each bottle and pooled into a third bottle and mixed thoroughly. 1.0 ml aliquots were removed from the pooled dispersion mix and inoculated into the first tube of a dilution series. This was carried out in duplicate. A serial dilution (10 fold steps) was carried out in the appropriate growth medium. At the predetermined time points the studs were removed from the test samples and place in the neutralising medium. The studs were processed in the same way as for the control sample. 1 ml aliquots were inoculated for the pooled samples in the first tube of a dilution series. This was carried out in duplicate. A serial dilution (10 fold steps) was carried out in the appropriate growth medium, with the first tube in each series containing the same medium supplemented with glycine (5.0 g/l) and sodium thiosulphate (5.0 g/l) to inactivate any residual biocide carried into the dilution series with the QST medium. The dilution series was incubated at 25° C. and read after 48 hours. The end point was scored as the highest dilution in the series to show turbidity.

Figure 2:
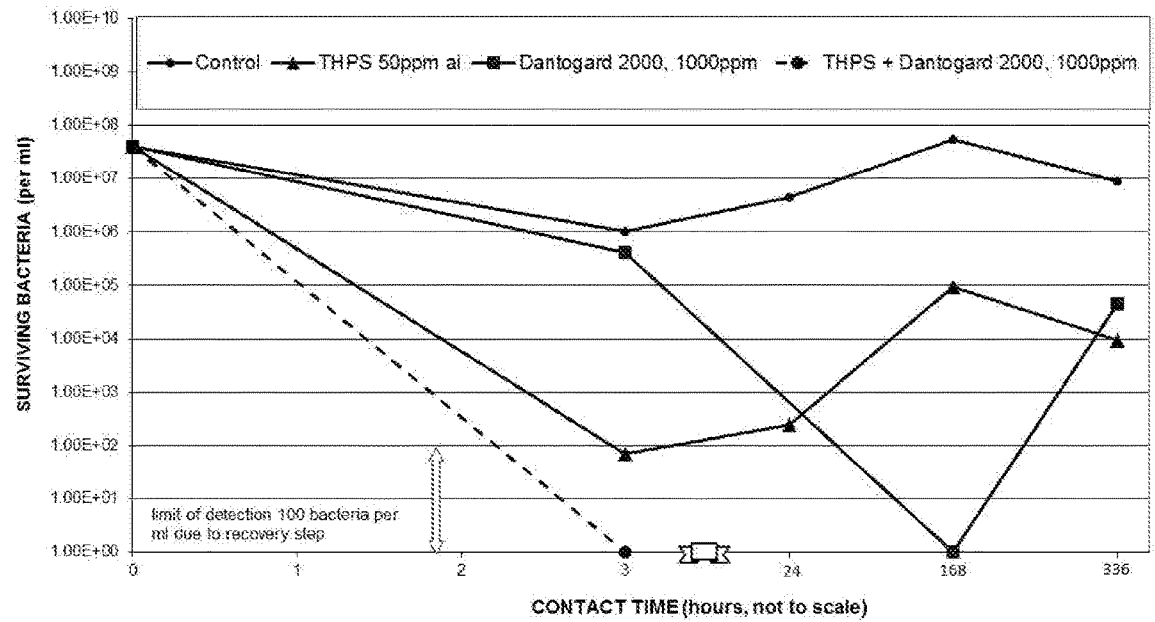
FIG. 2 provides a standard quantitative suspension test on the effect of the composition based on THPS and 1,3-Dimethylol-5,5-dimethylhydantoin (referred to as DANTOGARD® 2000 and treatment concentrations expressed as product containing approximately 50% active ingredient of 1,3-Dimethylol-5,5-dimethylhydantoin) against General Heterotrophic Bacteria *Pseudomonas aeruginosa* contained in an artificial biofilm.

The experiment shows that at all contact times the combination of THPS and and 1,3-Dimethylol-5,5-dimethylhydantoin provide an enhanced reduction in bacterial numbers. (FIG. 2).

Example 3—Composition Based on Formulated THPS, Such as TOLCIDE® PS50A and TOLCIDE® 4FRAC (Solvay), and 1,3-Dimethylol-5,5-Dimethylhydantoin, Such as DANTOGARD® 2000 (Lonza), Against General Heterotrophic Bacteria *Pseudomonas aeruginosa* Contained in an Artificial Biofilm Sample Preparation.

250 ppm 1,3-Dimethylol-5,5-dimethylhydantoin and 50 ppm formulated THPS were used to treat an artificial biofilm containing General Heterotrophic Bacteria *Pseudomonas aeruginosa*. A sterile QST medium was used for the studies. The bacterial challenge comes from the artificial biofilm. Studs were prepared from a 16 hour *Pseudomonas aeruginosa* culture grown in the appropriate growth medium. A sterile filter paper (Whatman No. 2) was placed onto an agar plate. 1 ml of 16 hr old culture was placed onto the surface and spread over the filter paper using a sterile spreader. Using sterile forceps 5 sterile freeze drying rubber bungs with O rings was placed onto the filter paper. The plates were incubated at 30° C. for approximately 5 days until the plate was covered with growth. The studs with biofilm were exposed to the biocide treatment for various contact times from 0 to 336 hours.

Sample Analysis.

The efficiency of the biocide treatments was measured using a standard quantitative suspension test (QST) method and enumerated using a most probable number (MPN) method. A typical QST procedure is described as follows: 90 ml of QST medium is dispensed into glass screw cap bottles (100 ml nominal capacity) with magnetic followers and cap with the modified tops. The bottles and contents were sterilised by autoclaving (121° C. for 15 minutes). On cooling a further 9 ml of sterile QST medium was added to the bottles to bring the final volume to 99 ml. Immediately prior to the test the biocide stock solutions (1,3-Dimethylol-5,5-dimethylhydantoin and THPS) were prepared in sterile QST medium at a concentration such that when 1.0 ml was added to the test bottles the desired concentration was achieved (final test volume 100 ml). They were added to the test samples immediately following preparation The bottles were placed on a Multiplate magnetic stirrer to mix the biocide. The stock solutions were prepared at concentrations on a weight for volume basis mg/ml such that when 1.0 ml was added to the inoculated QST medium (final volume 100 ml) the desired final concentration of biocide was achieved. Two bottles were set up per biocide being tested per time point and two bottles for a biocide free control. Using sterile forceps one stud was removed from the plate, taking care not to disturb the biofilm, and using the modified tops place in the test bottles. Approximately 2 ml amounts of sterile glass beads of 1.5 to 2.5 mm diameter and sterile acid washed sand 50-150 mesh was dispensed into sterile screw cap plastic universal containers (30 ml nominal capacity). To these was added 10 ml sterile neutralising solution, QST medium supplemented with 5 g/L Sodium Thiosulphate and 5 g/L Glycine. One container is required per stud. A further two studs are removed from the plates for the Time 0 control samples and placed directly into the neutralising medium. The contents were vortex mixed at maximum speed in 3 consecutive 45 second bursts with a 15 second interval between each burst. The purpose of this procedure is to mechanically remove biofilm from the surface of the coupons and to further disrupt the removed biofilm into small fragments thereby producing a reasonably uniform dispersion of biofilm for enumeration. An aliquot of 5 ml was removed from each bottle and pooled into a third bottle and mixed thoroughly. 1.0 ml aliquots were removed from the pooled dispersion mix and inoculated into the first tube of a dilution series. This was carried out in duplicate. A serial dilution (10 fold steps) was carried out in the appropriate growth medium. At the predetermined time points the studs were removed from the test samples and place in the neutralising medium. The studs were processed in the same way as for the control sample. 1 ml aliquots were inoculated for the pooled samples in the first tube of a dilution series. This was carried out in duplicate. A serial dilution (10 fold steps) was carried out in the appropriate growth medium, with the first tube in each series containing the same medium supplemented with glycine (5.0 g/l) and sodium thiosulphate (5.0 g/l) to inactivate any residual biocide carried into the dilution series with the QST medium. The dilution series was incubated at 25° C. and read after 48 hours. The end point was scored as the highest dilution in the series to show turbidity.

Figure 3:
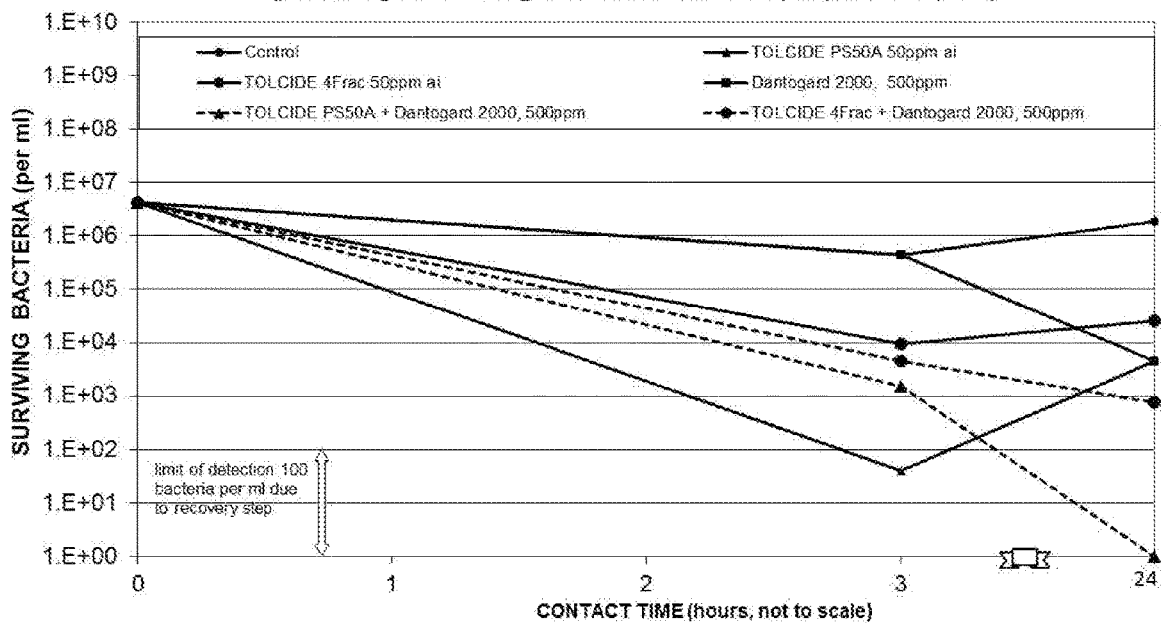
FIG. 3 provides a standard quantitative suspension test on the effect of the composition based on formulated THPS and 1,3-Dimethylol-5,5-dimethylhydantoin (referred to as DANTOGARD® 2000 and treatment concentrations expressed as product containing approximately 50% active ingredient of 1,3-Dimethylol-5,5-dimethylhydantoin) against General Heterotrophic Bacteria *Pseudomonas aeruginosa* contained in an artificial biofilm.
Figure 4:
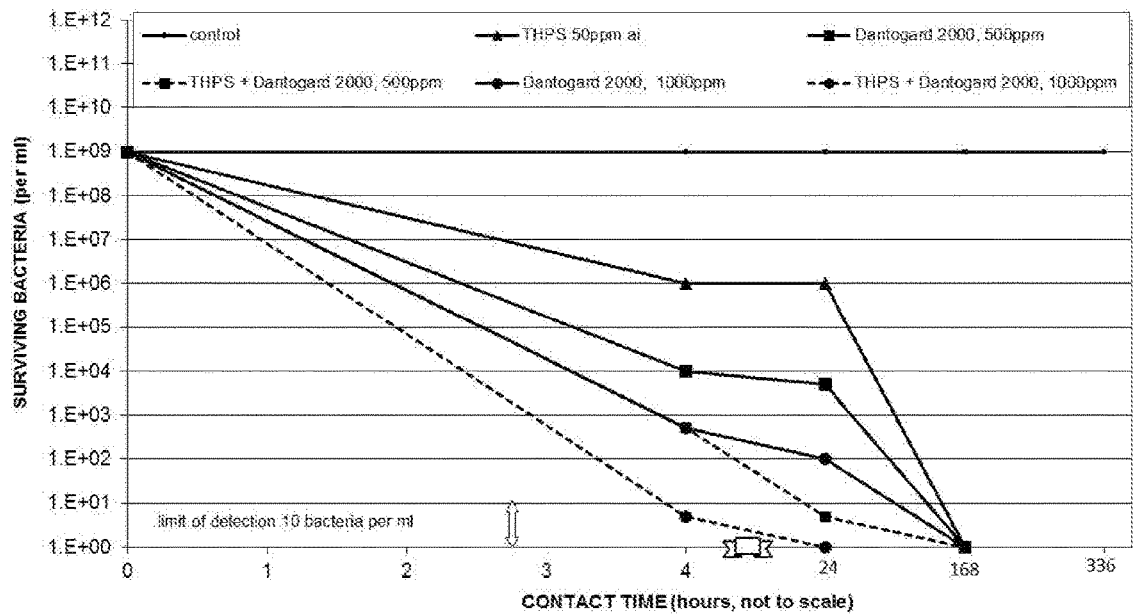
FIG. 4 provides a standard quantitative suspension test on the effect of the composition based on THPS and 1,3-Dimethylol-5,5-dimethylhydantoin against planktonic sulphate reducing bacteria.

The experiment shows that the combination of formulated THPS and and 1,3-Dimethylol-5,5-dimethylhydantoin provide an enhanced reduction in bacterial numbers after a 24 hour contact time. (FIG. 3).

Example 4—Co-Application of THPS and 1,3-Dimethylol-5,5-Dimethylhydantoin, Such as DANTOGARD® 2000 (Lonza), Against Planktonic Sulphate Reducing Bacteria Sample Preparation.

250 ppm and 500 ppm 1,3-Dimethylol-5,5-dimethylhydantoin and 50 ppm THPS were used to treat a planktonic sulphate reducing bacterial culture. For the marine strains used the basal medium used is Artificial Sea Water (ASW) (ASTM D1141-90). Inocula of mixed SRB population was prepared by growth in a modified Postgate's Medium C. Cultures were grown in Postgate's Medium C for between 48 to 64 hours at 30° C. (18 ml volumes contained in 20 ml capacity crimp cap serum vials with rubber septa.) The Basal medium (approximately 270 ml) was dispensed into 300 ml nominal capacity medical flats with screw cap and sterilised by autoclaving at 121° C. for 15 minutes. On cooling 10 ml of growth supplements was added to the basal medium and the medium innoculated with the mixed SRB population (18 ml). The medical flats were incubated at 30° C. for 72 hours until the medium had developed significant turbidity and the dissolved sulphide concentration was in excess of 100 mg/l.

Sample Analysis.

The efficiency of the biocide treatments was measured using a standard quantitative suspension test (QST) method and enumerated using a most probable number (MPN) method. The QST procedure is described as follows: At the start of the QST 18 ml volumes of culture were dispensed into pre-sterilised 20 ml capacity crimp cap serum vials with rubber septa. Two serum vials were used for each biocide in the test and the biocide free control. For those serum vials containing biocide one of the pair is used to sample at 45 and 90 minutes and the other at other relevant time points. Fresh stock solutions of biocide in Artificial Sea Water are prepared to ASTM D1141-91 and added to the QST medium immediately following preparation. The stock solutions were prepared at concentrations on a weight for volume basis mg/ml such that when 0.5 ml of the stock solution was added to the test sample (final volume 18.5 ml) the desired final concentration of biocide is achieved. 0.50 ml of sterile ASW was added to the biocide free controls instead of the biocide stock solution. The samples were mixed thoroughly and placed in an incubator (30° C.) for the duration of the test. Controls were sampled throughout the experiment. For each sample point a separate serum vial was used. At each sample point 2×1.0 ml aliquots was removed from the serum vials using a 1.0 ml syringe and 21 gauge needle this was used to inoculate the first vial of a duplicate dilution series in Postgate's Medium B. A dilution series was carried out and incubated at 30° C. The series was read at intervals of up to 4 weeks. The end point was scored as the highest dilution in the series to show iron sulphide precipitation (blackening).

The experiment shows that the combination of formulated THPS and and 1,3-Dimethylol-5,5-dimethylhydantoin provide an enhanced reduction in bacterial numbers after a 4 hour and 24 hour contact time.

Example 5—End-Use Formulations of THPS and 1,3-Dimethylol-5,5-Dimethylhydantoin, Such as DANTOGARD® 2000 (Lonza), Formulation Stability, Performance Against Planktonic General Heterotrophic Bacteria *Pseudomonas aeruginosa* and *Lactobacillus brevis*

Table 1 illustrates that stable formulations were observed after four months storage at room temperature and 50° C.

TABLE 1

| Storage Temp | THPS:1,3-Dimethylol-5,5-dimethylhydantoin | Formaldehyde (HCHO) % w/w at 4 months | % THPS assay Value after 4 month's storage. | | | |
|---|---|---|---|---|---|---|
| | | | 0 | 1 | 2 | 4 |
| Room Temp | 1:1.25 | <0.2% w/w | 19.82 | 19.41 | 19.35 | 19.42 |
| 50° C. | 1:1.25 | <0.2% w/w | — | 19.41 | 19.00 | 18.06 |

Figure 5:
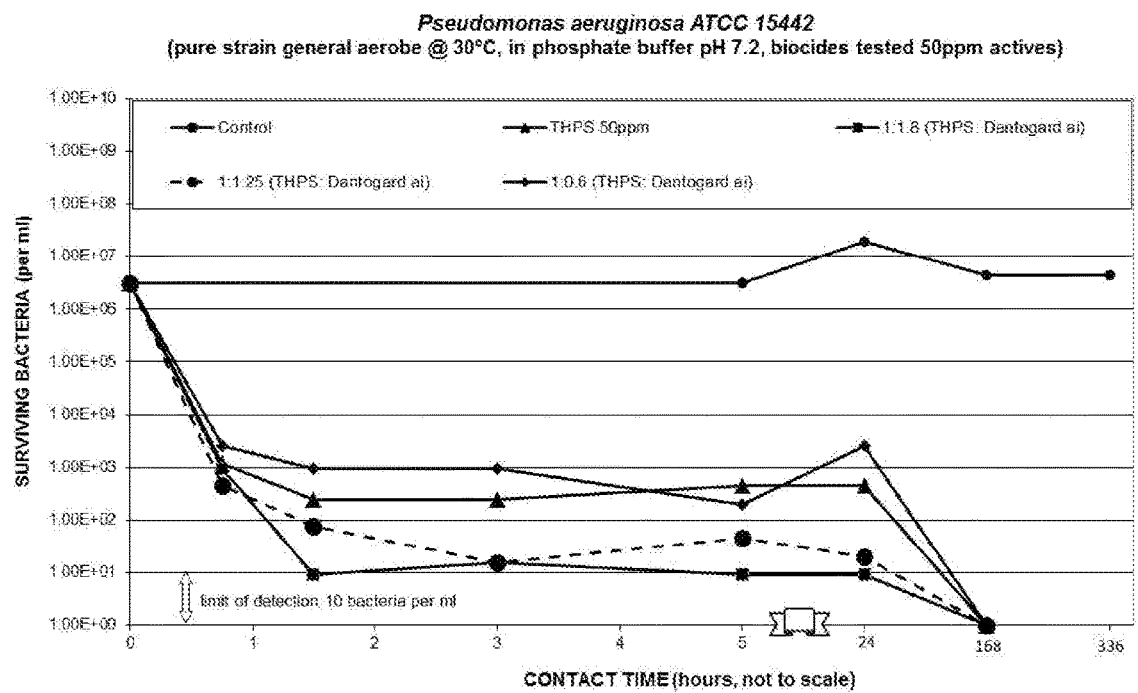
FIG. 5 provides a standard quantitative suspension test on the effect of the composition based on THPS and 1,3-Dimethylol-5,5-dimethylhydantoin (referred to as DANTOGARD® 2000 and treatment concentrations expressed as product containing approximately 50% active ingredient of 1,3-Dimethylol-5,5-dimethylhydantoin) against planktonic General Heterotrophic Bacteria *Pseudomonas aeruginosa*.
Figure 6:
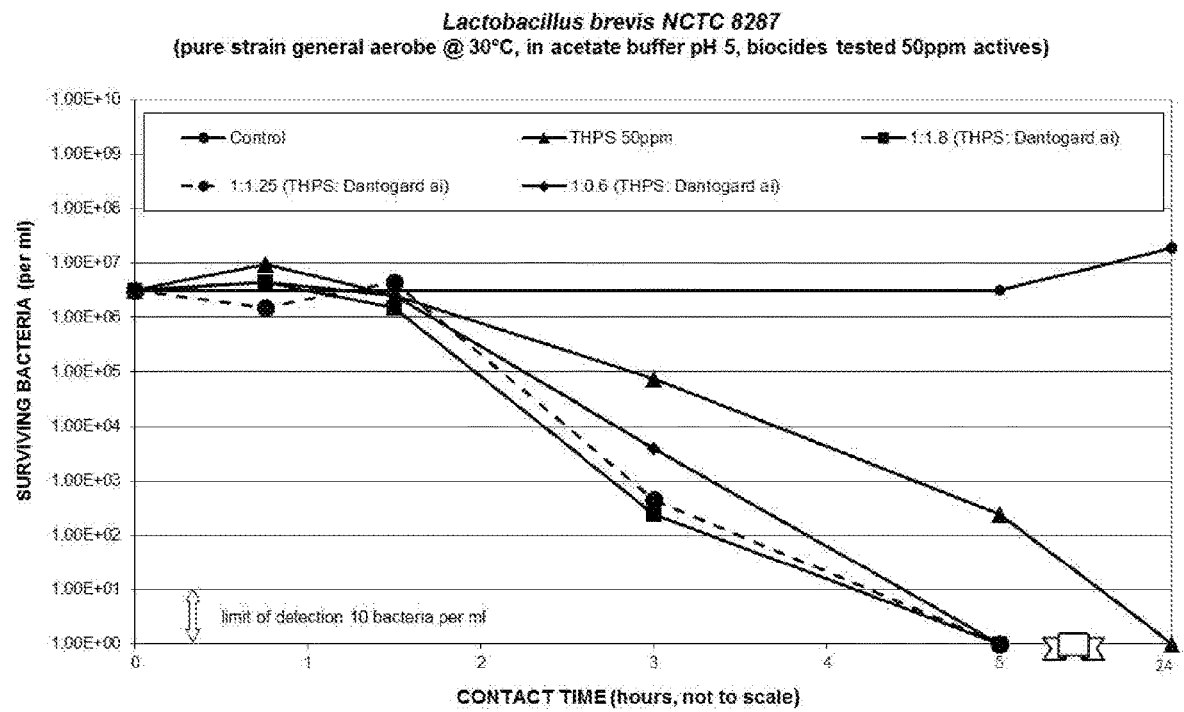
FIG. 6 provides a standard quantitative suspension test on the effect of the composition based on THPS and 1,3-Dimethylol-5,5-dimethylhydantoin (referred to as DANTOGARD® 2000 and treatment concentrations expressed as product containing approximately 50% active ingredient of 1,3-Dimethylol-5,5-dimethylhydantoin) against *Lactobacillus Brevis*.

Results in FIGS. 5 and 6 indicate a faster speed of kill versus *Pseudomonas aeruginosa* especially at early time points for the end-use formulations. In *Lactobacillus brevis* experiments, the reduction of bacteria to give a total kill is achieved at a 5 hour contact time. Performance of the THPS/1,3-Dimethylol-5,5-dimethylhydantoin formulation is 2 log orders better than THPS alone, such an improved performance at short contact times is quite unexpected.

We claim:

1. A method for preparing a well treatment fluid composition comprising the steps of:
   obtaining a composition comprising a tetrakis(hydroxyorgano)phosphonium salt, 1,3-dimethylol-5,5-dimethylhydantoin, and optionally one or more members selected from the group consisting of:
   oxidizing viscosity breakers,
   quaternary ammonium compounds, and
   polymers of an unsaturated carboxylic acid or copolymers of an unsaturated carboxylic add with a sulphonic acid, said polymers or copolymers being terminated by a mono- or di-phosphonated unsaturated carboxylic add group or having such monomers incorporated into the polymer backbone,
   wherein the composition achieves a reduction of bacteria to give a total kill at 5 hour contact time; and
   diluting the composition to form a diluted composition.

2. The method of claim 1, wherein the tetrakis(hydroxyorgano)phosphonium salt is selected from the group consisting of
   tetrakis(hydroxymethyl)phosphonium sulphate,
   tetrakis(hydroxymethyl)phosphonium chloride,
   tetrakis(hydroxymethyl)phosphonium phosphate,
   tetrakis(hydroxymethyl)phosphonium nitrate, and
   tetrakis(hydroxymethyl)phosphonium oxalate.

3. The method of claim 1, wherein the composition includes an oxidizing viscosity breaker and the breaker is selected from the group consisting of hydrogen peroxide, sodium persulfate, encapsulated ammonium persulfate, and sodium chlorite.

4. The method of claim 1, wherein the mass ratio between the THP salt and 1,3-dimethylol-5,5-dimethylhydantoin is about 1:0.5 to about 1:25.

5. The method of claim 4 further including comprising at least one oxidizing viscosity breaker.

6. The method of claim 1, wherein the composition contains less than 0.2% free formaldehyde after 4 months storage at 50° C.

7. The method of claim 4, wherein the composition contains less than 0.2% free formaldehyde after 4 months storage at 50° C.

8. A method for treating a subterranean formation comprising the step of introducing a composition into the formation, wherein the composition comprises a tetrakis(hydroxyorgano)phosphonium salt, 1,3-dimethylol-5,5-dimethylhydantoin, and optionally one or more members selected from the group consisting of:
   oxidizing viscosity breakers,
   quaternary ammonium compounds, and
   polymers of an unsaturated carboxylic acid or copolymers of an unsaturated carboxylic add with a sulphonic acid, said polymers or copolymers being terminated by a mono- or di-phosphonated unsaturated carboxylic add group or having such monomers incorporated into the polymer backbone,
   wherein the composition achieves a reduction of bacteria to give a total kill at 5 hour contact time.

9. The method of claim 8, wherein the tetrakis(hydroxyorgano)phosphonium salt is selected from the group consisting of
   tetrakis(hydroxymethyl)phosphonium sulphate,
   tetrakis(hydroxymethyl)phosphonium chloride,
   tetrakis(hydroxymethyl)phosphonium phosphate,
   tetrakis(hydroxymethyl)phosphonium nitrate, and
   tetrakis(hydroxymethyl)phosphonium oxalate.

10. The method of claim 8, wherein the composition includes an oxidizing viscosity breaker and the breaker is selected from the group consisting of hydrogen peroxide, sodium persulfate, encapsulated ammonium persulfate, and sodium chlorite.

11. The method of claim 8, wherein the mass ratio between the THP salt and 1,3-dimethylol-5,5-dimethylhydantoin is about 1:0.5 to about 1:25.

12. The method of claim 11 further including comprising at least one oxidizing viscosity breaker.

13. The method of claim 8, wherein the composition contains less than 0.2% free formaldehyde after 4 months storage at 50° C.

14. The method of claim 11, wherein the composition contains less than 0.2% free formaldehyde after 4 months storage at 50° C.

* * * * *